United States Patent [19]

Nottes et al.

[11] 4,090,946

[45] May 23, 1978

[54] METHOD OF STABILIZING MINERAL OIL AND ITS REFINERY PRODUCTS

[75] Inventors: Guenther Nottes, Limburgerhof; Klaus Bronstert, Carlsberg; Peter Klaerner, Ludwigshafen, all of Germany

[73] Assignee: BASF Aktiengesellschaft, Germany

[21] Appl. No.: 701,116

[22] Filed: Jun. 30, 1976

[30] Foreign Application Priority Data

Jul. 12, 1975 Germany .............................. 2531234

[51] Int. Cl.$^2$ ......................... C10G 9/16; C10L 10/04
[52] U.S. Cl. .................... 208/48 AA; 44/63; 44/71; 252/47.5
[58] Field of Search .................. 44/62, 63, 71; 252/47.5; 208/48 AA

[56] References Cited

U.S. PATENT DOCUMENTS

| | | | |
|---|---|---|---|
| 3,010,810 | 11/1961 | Stayner et al. | 44/62 |
| 3,051,562 | 8/1962 | Gee et al. | 44/62 |
| 3,172,892 | 3/1965 | LeSuer et al. | 208/48 AA UX |
| 3,186,810 | 6/1965 | Dunworth | 44/62 |
| 3,271,296 | 9/1966 | Gonzalez | 208/48 AA |
| 3,379,515 | 4/1968 | Lindstrom et al. | 44/62 |
| 3,413,104 | 11/1968 | Mehmedbasich | 44/62 |
| 3,450,513 | 6/1969 | Patinkin et al. | 44/62 |
| 3,458,295 | 7/1969 | Mehmedbasich | 44/62 |
| 3,652,239 | 3/1972 | Sweeney et al. | 44/62 X |
| 3,729,529 | 4/1973 | Andress | 44/62 X |
| 3,909,215 | 9/1975 | Krey | 44/62 |

FOREIGN PATENT DOCUMENTS

1,308,046 2/1973 United Kingdom ................ 44/62

Primary Examiner—Daniel E. Wyman
Assistant Examiner—Thomas A. Waltz
Attorney, Agent, or Firm—Keil, Thompson & Shurtleff

[57] ABSTRACT

The method of stabilizing mineral oil and its refinery products by addition thereto of a small stabilizing amount of alternating copolymers of the type

... A — B — A — B — A ...

in which A denotes the structural unit of the general formula

—C(R$^1$)(R$^2$) - CH$_2$ — where R$^1$ denotes hydrogen or alkyl of from 1 to 8 carbon atoms and R$^2$ has the meanings stated for R$^1$ or denotes a phenyl group, and in which B stands for structural units of the general formulae

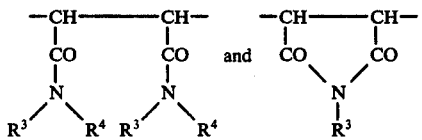

where R$^3$ denotes a saturated hydrocarbon radical of from 8 to 20 carbon atoms and R$^4$ denotes hydrogen or alkyl of from 8 to 20 carbon atoms.

2 Claims, No Drawings

METHOD OF STABILIZING MINERAL OIL AND ITS REFINERY PRODUCTS

The present invention relates to stabilizers for mineral oils and refinery products such as gas oils, crude oils and recycle oils to counteract settlement of sediments during storage and particularly during heating.

It is known that mineral oils and products thereof such as heating oils and fuels tend to form sediments which cause trouble in use or during transport through pipelines and pumps. This tendency is particularly noticeable in thermal treatments where the sediments become deposited in large quantities and preferentially on the heat transfer surfaces, where they form incrustations which are difficult to remove and which impair heat exchange and finally cause scaling of the heat exchanger tubes. The results are increased cycle times during processing of the refinery products, for example during distillation, increased energy consumption and higher maintenance costs.

The sediments essentially consist of polymeric substances and also of inorganic sulfur-containing and iron-containing compounds which form during thermal treatment and precipitate either immediately or subsequently during storage or during transport of the refinery products. Once these solid or highly viscous substances have become deposited, they can be removed only with extreme difficulty, for example by mechanical means or by burning off by the use of welding torches.

Means proposed for preventing such deposits are the so-called antifouling agents of various chemical constitution which are added to the mineral oils and refinery products. These include reaction products of low molecular weight polyalkylenes, maleic acid (anhydride) and polyamines or 1,2-diaminopropane (see U.S. Pat. Nos. 3,271,295 and 3,271,296). In some cases these agents have a very good effect, but only when used in the relatively high concentrations of from 500 to 1,000 ppm. Furthermore, their action is limited to certain specific mineral oils and refinery products.

It is an object of the invention to provide stabilizers for mineral oils and refinery products which are universally applicable and are effective in very low concentrations.

We have found that alternating copolymers of the structure

...A—B—A—B—A...

in which A denotes the structural unit of the general formula

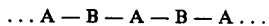

where $R^1$ denotes hydrogen or alkyl of from 1 to 8 carbon atoms and $R^2$ has the meanings stated for $R^1$ or denotes a phenyl group, and in which B stands for structural units of the general formula

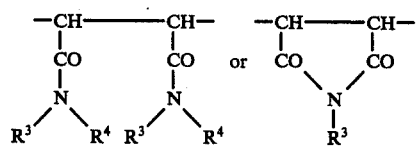

where $R^3$ denotes a saturated hydrocarbon radical of from 8 to 20 carbon atoms and $R^4$ denotes hydrogen or alkyl of from 8 to 20 carbon atoms, are eminently suitable for use as stabilizers for mineral oils, refinery products and similar industrial hydrocarbons.

The copolymers to be used in the present invention are known per se or may be obtained in known manner by free-radical copolymerization of olefins of the formula

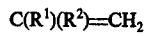

with maleic acid amides or imides of the formula

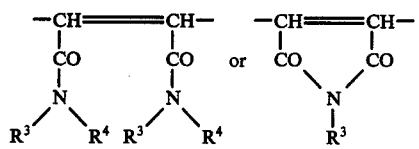

or by free-radical copolymerization of olefins with maleic acid (anhydride) followed by polymer-analogous amidation with amines of the formula $NH(R^3)(R^4)$ or $NH_2R^3$. The alternating structure forms automatically during copolymerization with maleic acid or its derivatives as defined above, as is generally known.

Suitable olefins for the formation of the copolymers are, for example, ethylene, propylene, but-1-ene, isobutene and styrene and mixtures of unsaturated hydrocarbons such as occur in the so-called $C_4$ and $C_5$ cuts. We prefer to use olefins having from 4 to 8 carbon atoms, particularly but-1-ene, isobutene and styrene.

Particularly suitable amines from which the structural unit B is derived are alkylamines of from 8 to 20 carbon atoms, particularly dodecylamine, tridecylamine and stearylamine. Highly suitable dialkylamines are, for example, di-2-ethylhexylamine and distearylamine.

The polymer-analogous reaction of the olefin/maleic acid (anhydride) copolymers with the amines may be conveniently carried out by heating the reactants in a relatively high-boiling hydrocarbon such as toluene and xylene.

When the compounds of the invention are prepared directly from the olefins and the maleic acid amides or imides, it is recommended that the polymerization is also carried out in a relatively high-boiling hydrocarbon such as toluene or xylene. In both cases there are obtained solutions which, possibly after further dilution, are directly suitable for addition to the mineral oils and refinery products which it is desired to stabilize.

The average degree of polymerization of the copolymers of the invention should preferably be from 10 to 100 and in particular from 20 to 50 units AB.

The copolymers to be used in accordance with the present invention, when added to mineral oils and refinery products of all kinds (industrial hydrocarbons), prevent sedimentation, particularly thermally induced separation of solid or highly viscous substances, either by suppressing the formation of such substances or by keeping them in solution. The concentrations required are usually from 20 to 100 ppm. Higher concentrations of up to about 200 ppm may be necessary if the hydrocarbons to be stabilized are to be subjected to particularly high thermal stresses.

The action of the stabilizers of the invention may be increased in some cases by the addition or use of from 10 to 50 ppm of an amine $NH(R^5)(R^6)$, where $R^5$ and $R^6$ denote saturated hydrocarbon radicals of from 6 to 14 carbon atoms. Dicyclohexylamine has proved particularly successful.

EXAMPLES, GENERAL TEST CONDITIONS

In each test, 250 ml of a solid-free industrial hydrocarbon were mixed with 50 ppm of a stabilizer, heated for 3 hours at 130° C with the passage of air therethrough, cooled and then passed through a filter paper having particularly good retention properties (blueband filter). The filter paper was then washed with heptane to remove adhering liquid hydrocarbon and dried. The residue was determined gravimetrically. The passage of air during heating serves to accelerate the formation of decomposition products for the purpose of the present short-term tests.

EXAMPLE 1

A distilled heating oil was stabilized with a copolymer of isobutene and N-stearyl maleimide (degree of polymerization 25). The residue was 4 mg. Without said addition the residue was 46 mg and with the addition of a reaction product (of approximately the same molecular weight) of polybutene, maleic anhydride and 1,2-diaminopropane the residue was 15 mg.

EXAMPLE 2

The same results as in Example 1 were obtained using a copolymer of isobutene and maleic anhydride which had been converted to the corresponding polymeric imide by polymer-analogous reaction with stearylamine in xylene.

EXAMPLE 3

The procedure of Example 1 was followed except that 35 ppm of the copolymer and 15 ppm of dicyclohexylamine were used as stabilizer. The residue was only 1 mg.

EXAMPLE 4

In a pressure distilling plant for the separation of butadiene from other $C_4$ hydrocarbons at from 35° to 60° C, deposits were formed on the heating coils, which deposits impaired heat transfer to such an extent that it was necessary to remove them mechanically at intervals of about 4 months.

The addition of 30 ppm of the copolymer stated in Example 1 to the hydrocarbon mixture introduced resulted in there being no undesirable deposits on the heating coils over a period of observation of about 6 months. It was not necessary to stop operation of the plant to clean the heat transfer surfaces.

EXAMPLE 5

In a large-scale plant for the distillation of crude oil, operated at from 350° to 400° C, deposits were formed on the heat transfer surfaces to such an extent that it was necessary to clean the said surfaces after an on-stream period of about 4 months.

The addition of 30 ppm of an isobutene-dodecyl-maleic imide copolymer having a degree of polymerization of 40 to the crude oil suppressed the formation of said deposits to such an extent that no stoppages for cleaning purposes were necessary over a period of observation of 6 months.

We claim:

1. A method of preventing sediments or deposits during the processing of mineral oil and its refinery products during distillation or other thermal treatment, which comprises adding to the mineral oil or its refinery products to be thermally treated
   (a) 10 to 50 ppm dicyclohexylamine, and
   (b) about 20 to 200 ppm of an alternating copolymer of the type $$\ldots A-B-A-B-A \ldots$$

in which A denotes the structural unit $$-C(CH_3)_2-CH_2-$$

originating from isobutene and in which B stands for structural units of the formulae

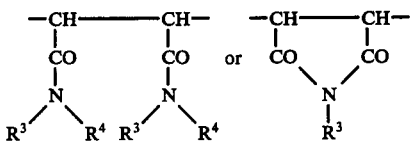

in which $R^3$ is alkyl of 8 to 20 carbon atoms and $R^4$ is hydrogen or alkyl of 8 to 20 carbon atoms, said copolymer having an average degree of polymerization of from 20 to 50 units AB.

2. A method as claimed in claim 1 wherein B is the structural unit derived from N-stearyl maleimide.

* * * * *